Patented Jan. 14, 1936

2,028,114

UNITED STATES PATENT OFFICE 2,028,114

BENZANTHRONE THIAZOLE AND PROCESS OF PREPARING THE SAME

Alexander J. Wuertz, Carrollville, and Myron S. Whelen, Milwaukee, Wis., assignors to E. I. du Pont de Nemours & Company, Wilmington, Del., a corporation of Delaware No Drawing. Application April 29, 1933, Serial No. 668,620

13 Claims. (Cl. 260—44)

This invention relates to sulfur compounds of the benzanthrone series. It is an object of this invention to prepare novel organic compounds which are useful as intermediates for dyestuffs. Other and further objects of this invention will appear as the description proceeds.

The compounds with which this invention deals are characterized by possessing in their structure both a benzanthrone configuration and a thiazole ring. They are represented generally by the formula:

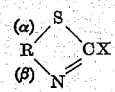

wherein R stands for the divalent residue of a benzanthrone and X stands for hydrogen, alkyl or aryl. We shall hereinafter refer to these compounds generally as α, β-benzanthrone-thiazoles, the positions α, β designating the attachment of the S and N atoms respectively in the anthaquinone nucleus.

Typical examples of the above compounds are α, β-benzanthrone-thiazole, α, β-benzanthrone-methyl-thiazole, α, β-benzanthrone-phenyl-thiazole and their substitution derivatives. We have found that these compounds form valuable intermediates for the manufacture of novel vat dyestuffs of the dibenzanthrone or isodibenzanthrone series. Thus, by fusing an intermediate of the above series with alkali, a sulfur containing dyestuff of the dibenzanthrone series is obtained. If, on the other hand, the intermediate is first halogenated and then subjected to fusion, an isodibenzanthrone compound is obtained. The halogenation evidently introduces a halogen atom in the Bzl-position of the benzanthrone nucleus, causing the subsequent fusion to produce an isodibenzanthrone compound instead of a dibenzanthrone.

We prepare our novel compounds by starting with an anthraquinone-1,2-thiazole as initial material. This in turn may be obtained by reacting a 2,2'-diamino-1,1'-dianthraquinonyl-disulfide with an aldehyde, in known manner. This initial material is then reduced in concentrated sulfuric acid and reacted either simultaneously or subsequently with glycerine to form a benzanthrone compound. It will be clear from the method of preparation that the final product may have a structure corresponding to one of the following three formulas:

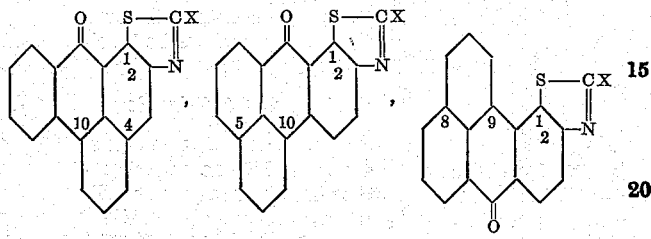

(1, 2, 4, 10)     (1, 2, 5, 10)     (1, 2, 8, 9)

It is uncertain, however, which one of the three is the correct formula, or whether indeed the product is not a mixture of the three or any two of them.

Without limiting our invention to any particular procedure, the following examples are given to illustrate our specific mode of operation. Parts are by weight.

*Example 1:—Benzanthrone-1,2-C-phenyl-thiazole*

10 parts of anthraquinone-1,2-C-phenyl-thiazole (prepared by the action of benzaldehyde on 2,2'-diamino-anthraquinone disulfide; see Example 8 below) are dissolved in 100 parts of concentrated sulfuric acid (66° Bé.), and sufficient water is added thereto to reduce the concentration of the sulfuric acid to about 82%. The reaction mass is then heated to 112–115° C. and at this temperature 9 parts of glycerol and 3.5 parts of ground iron are simultaneously added over a period of three hours. The temperature is then raised to 118° C. and maintained for one hour. If the reaction is still incomplete, 1 part of additional glycerol and 0.5 part of iron are added simultaneously over a period of one hour at 118–120° C. When complete benzanthrone formation has taken place the mass is cooled to 80° C. and poured into a large volume of water and heated at 80° C. for one hour. It is then filtered, and the filter cake is washed acid free with water. This product is then suspended in approximately 500 parts of water containing sufficient caustic alkali to keep the suspension alkaline after heating for 2 hours at 90–100° C. and heated at 90–100° C. for 2 hours. It is then filtered, washed with water until free of alkali, and dried. The benzanthrone-phenyl-thiazole so obtained is a brownish-yellow powder, which on dissolving in concentrated sulfuric acid gives an orange-red coloration with a yellow fluorescence. It dyes cotton in weak yellow shades.

*Example 2:—Benzanthrone-1,2-C-methyl-thiazole*

10 parts of anthraquinone-1,2-C-methyl-thiazole (prepared by the action of acetaldehyde or paraldehyde on 2,2'-diamino-anthraquinone-disulfide; see Example 9 below) are dissolved in 100 parts of concentrated sulfuric acid (66° Bé.), and sufficient water is added thereto to reduce the concentration of the sulfuric acid to about 82%. The reaction is then heated to 112–115° C., and at this temperature 9 parts of glycerol and 3.5 parts of ground iron are simultaneously added at a uniform rate over a period of three hours. The reaction mass is then heated to 118° C. and this temperature is maintained one hour. The benzanthrone-methyl-thiazole so formed is then isolated in a manner analogous to that of the benzanthrone-phenyl-thiazole in Example 1. The product so obtained is a brownish-yellow powder which on dissolving in concentrated sulfuric acid gives an orange-red coloration with yellow fluorescence.

*Example 3:—Benzanthrone-1,2-thiazole*

10 parts of anthraquinone-1,2-thiazole (prepared by the action of formaldehyde or trioxymethylene on 2,2'-diamino-anthraquinone-disulfide; see Example 9 below) are dissolved in 100 parts of concentrated sulfuric acid (66° Bé.) and sufficient water is added thereto to reduce the concentration of the sulfuric acid to 82%. The mass is then heated under agitation to 112–115° C. and at this temperature over a period of three hours 8.5 parts of glycerol and 3.5 parts of powdered iron are simultaneously added at a uniform rate. The temperature is then raised to 118–120° C. and this temperature is maintained for a further period of one hour. The completed reaction is then cooled to about 80° C. and poured into a large volume of water. The benzanthrone-1,2-thiazole so formed is isolated in a manner similar to that used for the isolation of benzanthrone-1,2-phenyl-thiazole shown in Example 1. The material so obtained on dissolving in concentrated sulfuric acid gives an orange-red coloration with strong yellow fluorescence.

*Example 4:—Benzanthrone-1,2-C-β-anthraquinonyl-thiazole*

10 parts of anthraquinone-1,2-C-β-anthraquinonyl-thiazole:

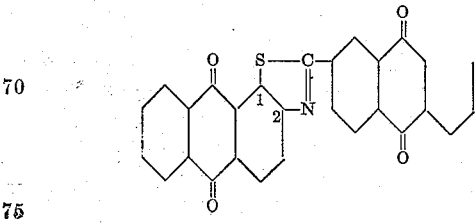

(See Example 8 below) are dissolved in 130 parts of concentrated sulfuric acid (66° Bé.) and sufficient water is added to reduce the concentration of the sulfuric acid to about 82%. The reaction mass is then heated to 112–115° C. and at this temperature 9 parts of glycerol and 3.5 parts of ground iron are simultaneously fed in over a period of three hours. The temperature is then raised to 118° C. and maintained at this value for a further period of about one hour. The benzanthrone-1,2-C-β-anthraquinonyl-thiazole is isolated in a manner analogous to that shown in Example 1. It is a greenish-yellow powder which on dissolving in concentrated sulfuric acid gives an orange-red color with yellow fluorescence.

*Example 5:—Benzanthrone-1,2-C-phenyl-thiazole*

10 parts of anthraquinone-1,2-C-phenyl-thiazole are dissolved in 100 parts of concentrated sulfuric acid (66° Bé.), and 2.5 parts of precipitated copper powder are added. The reaction mass is then heated under agitation to 40° C. and maintained at a temperature of 40–50° C. for about six hours or until the copper has all disappeared. It is then filtered and the filtrate is diluted with a sufficient quantity of water to reduce the acid concentration to about 82%. It is then heated to 112–115° C. and 9 parts of glycerol are added at this temperature at a uniform rate over a period of three hours. The temperature is then raised to 118–120° C. and the whole is heated for a further period of one hour. The benzanthrone-1,2-C-phenyl-thiazole is then isolated in a manner similar to that shown in Example 1.

In an analogous manner to the above examples, substituted α, β-benzanthrone-thiazoles may be prepared by starting with the correspondingly substituted anthraquinone-1,2-thiazoles. Alternatively, certain substituents may be introduced into the final products by well known chemical operations, such as halogenation, nitration, sulfonation or oxidation. The effect here is generally analogous to that of carrying out the same operation on ordinary benzanthrone. For instance, oxidation leads first to a dibenzanthronyl compound and then to a dihydroxy-dibenzanthronyl compound. Monochlorination enters chlorine into the Bzl-position, while more intense chlorination introduces further chlorine, most probably in the anthraquinone nucleus. The following examples will illustrate the process of introducing halogen into the Bzl-position.

*Example 6:—Bzl-bromo-benzanthrone-1,2-C-phenylthiazole*

10 parts of benzanthrone-1,2-C-phenyl-thiazole as obtained in Example 1 are first finely subdivided by dissolving in 100 parts of concentrated sulfuric acid (66° Bé.) and reprecipitating in a large volume of water, filtering, and washing with water until free of acid. This material is then suspended in 500 parts of cold water and thereto are added, below the surface of the liquid, 5 parts of liquid bromine. The reaction is most conveniently carried out in a closed vessel. The mass is agitated for sixteen hours at room temperature; it is then heated to 70° C. and held at this temperature for one hour. The Bzl-bromo-benzanthrone-1,2-C-phenyl-thiazole is then isolated by filtration. It is washed free of acid with water and dried. It is a yellow compound, which on dissolving in concentrated sulfuric acid gives a cherry-red coloration.

*Example 7:—Bzl - chloro - benzanthrone-1,2-C-phenyl-thiazole*

10 parts of benzanthrone-1,2-C-phenyl-thiazole are finely subdivided as in Example 6 and are then suspended in 500 parts of water to which are then added 40 parts of concentrated sulfuric acid. A solution containing 30 parts of sodium chlorate and 60 parts of sodium chloride is then added slowly over a period of three hours. The reaction is complete when one atom of chlorine has been absorbed into the benzanthrone-1,2-C-phenyl-thiazole molecule as shown by analysis. The Bzl-chloro-benzanthrone-1,2-C-phenyl-thiazole is then isolated by filtration, washed and dried.

The initial materials used in Examples 1 to 5 are prepared in known manner from 1-mercapto-2-amino-anthraquinone, or its corresponding disulfide, and the corresponding aldehyde. The following additional examples will illustrate our specific mode of procedure.

*Example 8:—Anthraquinone - 1,2 - C - β-anthraquinonyl-thiazole*

10 parts of 1-mercapto-2-amino-anthraquinone or an equal weight of 2,2'-diamino-dianthraquinonyl-disulfide are dissolved in 100 parts of concentrated sulfuric acid (66° Bé.) and 10 parts of anthraquinone-β-aldehyde are added thereto at a temperature of 25–50° C. Sulfur dioxide is evolved. The reaction mass is then heated to 70° C. over a short period of time and is then cooled to about 40° C. Sufficient water is slowly added until the anthraquinone - 1,2-anthraquinonyl-thiazole crystallizes out, which occurs at an acid concentration of about 75%. The product is then filtered off, washed with 75% sulfuric acid, heated up in water, filtered and washed acid free.

The anthraquinone - 1,2-C-β-anthraquinonyl-thiazole so formed is greenish-yellow in color and dissolves in concentrated sulfuric acid with a yellow color.

If, in lieu of 10 parts of anthaquinone-aldehyde, 6 parts of benzaldehyde are used, the rest of the procedure remaining the same, anthraquinone-1,2-C-phenyl-thiazole is obtained.

*Example 9:—Anthraquinone-1,2-thiazole*

10 parts of 1-mercapto-2-amino-anthraquinone or an equal weight of 2,2'-diamino-dianthraquinonyl-disulfide are dissolved in 100 parts of concentrated sulfuric acid (66° Bé.) and 1.5 parts of trioxymethylene are added thereto at a temperature of 25–50° C. Sulfur dioxide is evolved. The reaction mass is then heated to 70° C. over a short period of time and then cooled to about 40° C. Sufficient water is then slowly added until the anthraquinone-1,2-thiazole crystallizes out, which occurs at an acid concentration of about 75%. The precipitate is then filtered off, washed with 75% sulfuric acid, heated up in water, filtered, and washed acid free. The anthraquinone-1,2-thiazole so formed is greenish-yellow in color and dissolves in concentrated sulfuric acid with a yellow color.

If in lieu of 1.5 parts of trioxymethylene-3 parts of paraldehyde or acetaldehyde are used, the rest of the procedure remaining the same, anthraquinone-1,2-methyl-thiazole is obtained.

It will be understood that many variations and modifications are possible in our preferred mode of operation without departing from the spirit of this invention.

We claim:

1. A compound of the general formula:

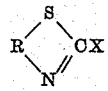

wherein R stands for a divalent benzanthrone radical to which the S and N are connected in the α and β positions respectively while X stands for hydrogen, alkyl or aryl.

2. An α, β-benzanthrone-thiazole.

3. An α, β-benzanthrone-C- phenyl-thiazole.

4. α, β-benzanthrone-C-phenyl-thiazole.

5. A Bzl-halogen-α, β-benzanthrone-thiazole.

6. Bzl-halogen-α, β-benzanthrone-C-phenyl-thiazole.

7. The process of producing a sulfur compound of the benzanthrone series which comprises reducing an anthraquinone-1, 2-thiazole which contains no substituent in the remaining α positions and reacting the same with glycerol in the presence of concentrated sulfuric acid.

8. The process of producing a sulfur compound of the benzanthrone series which comprises reducing an anthraquinone-1, 2-thiazole which contains no substituent in the remaining α positions by the aid of a reducing metal in concentrated sulfuric acid, adding glycerol and heating until benzanthrone formation is complete.

9. The process of producing a sulfur compound of the benzanthrone series which comprises reacting an α, β-anthraquinone thiazole which contains no substituent in the remaining α positions simultaneously with a reducing metal and glycerol in concentrated sulfuric acid.

10. The process of producing a sulfur compound of the benzanthrone series which comprises reacting an α, β-anthraquinone thiazole which contains no substituent in the remaining α positions with a reducing metal and glycerol in concentrated sulfuric acid to form a benzanthrone compound, recovering the latter and subjecting the same to an operation selected from the group consisting of halogenation, nitration, and sulfonation.

11. The process of producing a sulfur compound of the benzanthrone series which comprises reacting an α, β-anthraquinone thiazole which contains no substituent in the remaining α positions with a reducing metal and glycerol in concentrated sulfuric acid to form a benzanthrone compound, recovering the latter and subjecting the same to halogenation whereby to introduce halogen in the Bzl-position.

12. The process of producing an α, β-benzanthrone-C-phenyl-thiazole which contains no substituent in the remaining α positions which comprises reacting a 1, 2-anthraquinone-C-phenyl-thiazole with a reducing metal and glycerine in concentrated sulfuric acid.

13. The process of producing a Bzl-halogen-α, β-benzanthrone-C-phenyl-thiazole which contains no substituent in the remaining α positions which comprises reacting a 1, 2-anthraquinone-C-phenyl-thiazole with a reducing metal and glycerine in concentrated sulfuric acid, recovering the product and subjecting the same to halogenation whereby to introduce one halogen atom.

ALEXANDER J. WUERTZ.
MYRON S. WHELEN.